United States Patent

Osgood

[11] Patent Number: 5,782,714
[45] Date of Patent: Jul. 21, 1998

[54] BICYCLE CHAIN GUIDE

[75] Inventor: Alan G. Osgood, Renton, Wash.

[73] Assignee: Evergreen Innovations, L.L.C., Redmond, Wash.

[21] Appl. No.: 789,750

[22] Filed: Jan. 27, 1997

[51] Int. Cl.$^6$ ............................................. B62J 13/00
[52] U.S. Cl. ............................................. 474/144; 474/273
[58] Field of Search ............................... 474/144, 148, 474/151, 273

[56] References Cited

U.S. PATENT DOCUMENTS

| | | |
|---|---|---|
| 3,835,729 | 9/1974 | Tarutani ................................. 474/144 |
| 4,237,743 | 12/1980 | Nagano. |
| 4,832,667 | 5/1989 | Wren ..................................... 474/140 |
| 5,002,520 | 3/1991 | Greenlaw. |
| 5,460,576 | 10/1995 | Barnett ................................. 474/144 |
| 5,676,616 | 10/1997 | Hara ..................................... 474/144 |

Primary Examiner—Tamara L. Graysay
Assistant Examiner—Gary S. Hartmann

[57] ABSTRACT

A bicycle drive chain (1) guide to prevent the drive chain (10) from derailing off the inside of the inner chain wheel. The chain guide is a simple one piece device which can be easily attached to the bicycle frame during manufacturing.

11 Claims, 1 Drawing Sheet

BICYCLE CHAIN GUIDE

BACKGROUND

1. The Field of the Invention

The present invention relates to bicycle drive chain guides wherein the chain guide keeps the chain from derailing off the inner side of the chain wheel assembly. More particularly, it relates to an inexpensive drive chain guide which may be permanently attached to the frame of bicycles.

2. The Prior Art

Most full size bicycles sold in the United States have multiple front sprockets or chain wheels. A front derailleur is used to select speeds or gear ratios by moving the drive chain from one sprocket to another. The front derailleur is supposed to keep the drive chain from derailing by falling off, or being thrown off, the inner side of the inner chain wheel. U. S. Pat. No. 4,237,743 teaches a drive chain guide that is integral to moveable members of a front derailleur. However, even with chain guides incorporated into the front derailleur, occasionally drive chains do derail. The derailment commonly happens during a hard shift, especially if the front derailleur is out of adjustment. A chain derailment is at best an inconvenience and at worst a serious safety hazard.

Two U.S. pat. No. disclose additional devices to prevent drive chain derailment off the inner side of the chain wheel assembly. U.S. Pat. No. 4,832,667 discloses a chain wheel chain guide which consists of a chain guide plate, a threaded clamp to secure the plate to the bicycle frame and one or more bolts. U.S. Pat. No. 5,002,520 discloses another chain guide to prevent chain derailment off the inner side of the chain wheel assembly. The chain guiding device of U.S. Pat. No. 5,002,520 is integral to a clamp that secures the chain guide device to the bicycle frame. The devices of U.S. Pat. No. 4,832,667 and U.S. Pat. No. 5,002,520 both include multiple pieces. The process of installing and adjusting these chain guides involves placing a clamp around the bicycle frame, properly positioning the clamp, and then tightening the bolt that holds the chain guide in place. The complexity of the devices and the labor required for installation increases the cost of the bicycle.

BRIEF SUMMARY OF THE INVENTION

The present invention is a bicycle chain guide which prevents the drive chain from derailing off the inside of the inner chain wheel. The chain guide is a simple one piece device which is permanently attached to the bicycle frame. The chain guide can be easily attached to the bicycle frame during manufacturing. The object of the invention is to produce an inexpensive effective chain guide. A second objective is to reduce the need for adjustment of the chain guide.

DETAILED DESCRIPTION OF THE INVENTION

Reference is now made to the drawings wherein like parts are designated with like numerals throughout.

Figure 1:
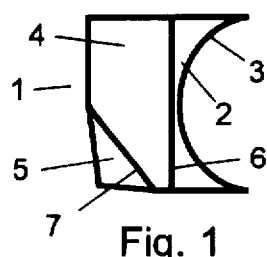
FIG. 1 is a view of the chain guide from the top.
Figure 2:
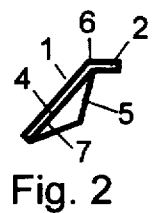
FIG. 2 is a view of the chain guide from the front.
Figure 3:
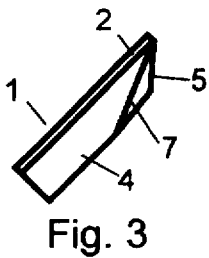
FIG. 3 is a view of the chain guide from the side.

FIGS. 1-3 illustrate the preferred embodiment of the bicycle drive chain guide 1 of the present invention. The chain guide is a simple plate made from sheet metal. A frame attachment section 2 provides means for permanently attaching the chain guide to a bicycle frame.

One edge 3 of the chain guide is shaped to conform to the shape of a bicycle frame seat tube. The rear chain contacting surface 4 prevents the chain from derailing from the inner chain wheel. The forward chain contacting surface 5 restrains a thrown chain and guides it back to the chain wheel. An angle 6 in the chain guide controls the orientation of the rear chain contacting surface 4 relative to the frame attachment section 2. A second angle 7 controls the orientation of the forward chain contacting surface relative to the rear chain contacting surface.

Figure 4:
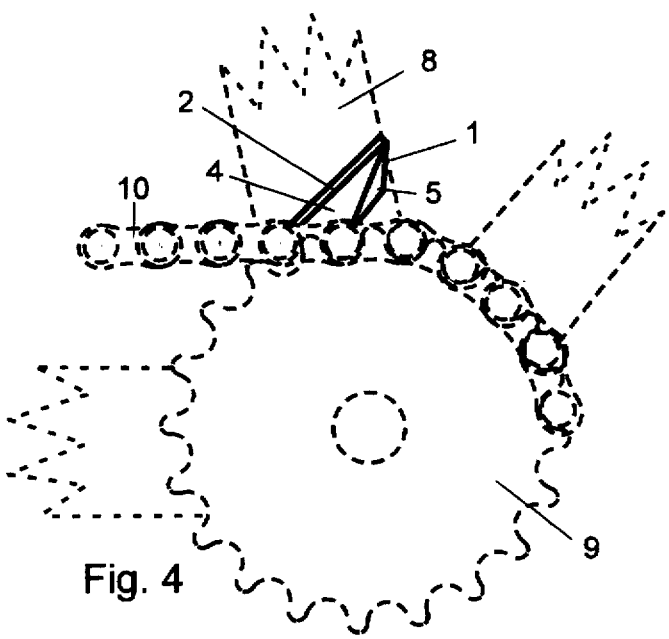
FIG. 4 is a side view of the chain guide installed on a bicycle seat tube.

FIG. 4 is a side view of the chain guide I attached to a bicycle seat tube 8. The chain guide is orientated so that the back edge is lower than the forward edge. The preferred embodiment is installed at an angle approximately 45° up from horizontal. The chain guide is positioned so that the rear chain contacting surface 4 extends below the top edge of the inner chain wheel 9.

Figure 5:
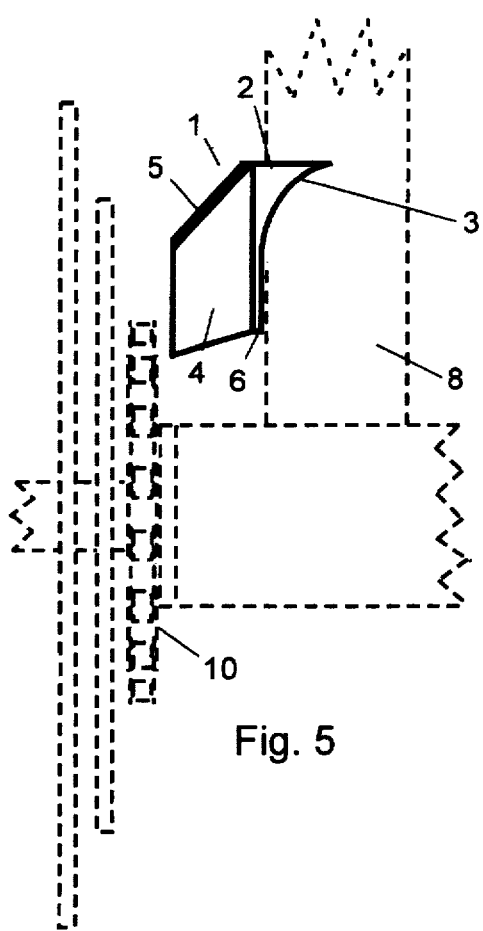
FIG. 5 is a front view of the chain guide installed on a bicycle seat tube.

FIG. 5 is a front view of the chain guide attached to the seat post. The drive chain 10 is shown as engaged on the inner chain wheel. When the bicycle drive chain 10 is engaged on the inner chain wheel, the rear chain contacting surface 4 of the chain guide extends below the drive chain. The horizontal distance between the rear chain contacting surface of the chain guide and the inner chain wheel is less than the width of the drive chain. The close proximity of the chain guide to the chain wheel prevents the drive chain from falling off the inside of the chain wheel.

Figure 6:
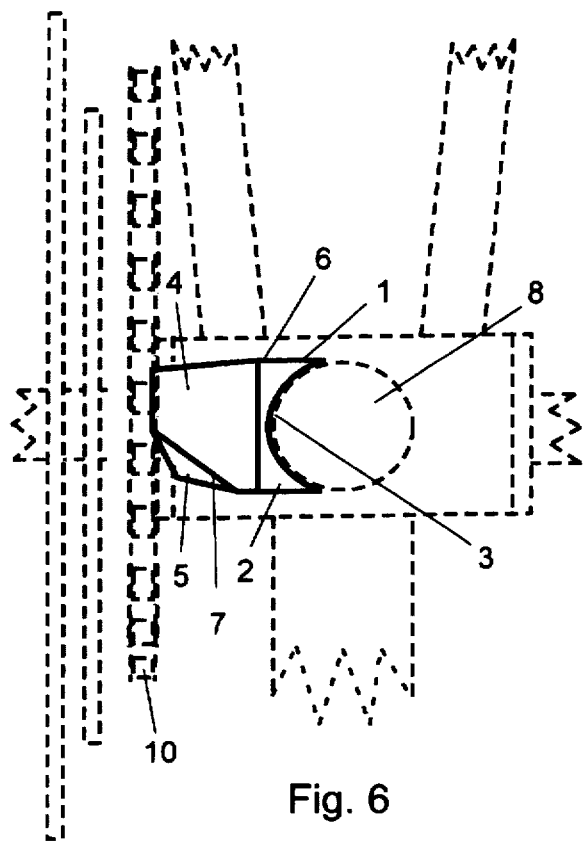
FIG. 6 is a top view of the chain guide installed on a bicycle seat tube.

FIG. 6 is a top view (looking straight down the seat tube of the chain guide attached to the seat tube. The shaped edge 2 of the chain guide conforms to the circular shape of the seat post. The forward chain contacting surface of the chain guide 5 angles down from the seat tube towards the inner chain wheel. Sometimes during a hard dozen shift the drive chain is thrown past the inner chain wheel towards the seat tube. In such a case the forward chain contacting surface 5 of the chain guide restrains the chain and returns it to the chain wheel.

The chain guide may become misaligned due to an accident or abuse. In such a case the chain guide could be realigned by hand pressure alone or by means of a simple tool such as pliers.

The preferred embodiment of the chain guide disclosed here is a simple plate made from sheet metal. Alternatively the chain guide could be fabricated from plastic, composites or other material. The preferred embodiment is made of sheet metal of uniform thickness. The thickness of the chain guide could decrease in thickness from the frame conforming edge to the opposite edge. The angle 5 in the chain guide plate could be formed as a curve of fixed or variable radius.

The chain guide can be positioned vertically on the seat tube to accommodate different size inner chain wheels. The dimensions of the chain guide can be sized for the distance from the seat tube to the inner chain wheel for a particular style of bicycle. The curved edge 2 of the chain guide can be shaped to conform to seat tube of different sizes and shapes.

The chain wheels of some styles of bicycles, such as recumbent bicycles, are not positioned near to the seat tube. For these bicycles the chain guide could be attached to any frame section which is in close approximation to the inner chain wheel.

In the preferred embodiment the chain guide is welded to a metal bicycle seat tube. Other means such as adhesive or composite material could be used to attach the chain guide to the seat tube. The chain guide could be attached to the seat tube during construction of the bicycle frame. Tooling for placement of the chain guide could be incorporated into the frame assembly tooling. The simplicity of the chain guide combined with the ease of installation minimizes the cost of the installed chain guide.

I claim:

1. A one piece chain guide for preventing derailment of a drive chain from a bicycle chain wheel, comprising a plate:

said plate having a frame attachment section with an edge that is permanently attached to a bicycle seat tube; said edge of said frame attachment section conforms to the shape of the bicycle seat tube; and a chain contacting surface, said chain contacting surface provides means for preventing said drive chain from derailing from said bicycle chain wheel.

2. The chain guide of claim 1 wherein the chain contacting surface is angled relative to said frame attachment section.

3. The chain guide of claim 1 wherein the chain guide is fabricated from metal.

4. The chain guide of claim 1 wherein the chain guide is fabricated from plastic or composites.

5. The chain guide of claim 1 wherein the frame attachment section is permanently attached to a bicycle frame by means of weld, adhesive or composite material.

6. A one piece chain guide for preventing derailment of a drive chain from a bicycle chain wheel, comprising a plate:

said plate having a frame attachment section with an edge that is permanently attached to a bicycle seat tube; said edge of said frame attachment section conforms to the shape of the bicycle seat tube; a first chain contacting surface, said first chain contacting surface provides means for preventing said drive chain from derailing from said bicycle chain wheel; and a second chain contacting surface, said second chain contacting surface provides means for restraining a thrown drive chain and guiding it back to the chain wheel.

7. The chain guide of claim 6 wherein The first chain contacting surface is angled relative to the frame attachment section.

8. The chain guide of claim 6 wherein the second chain contacting surface is angled relative to the first chain contacting surface.

9. The chain guide of claim 6 wherein the chain guide is fabricated from metal.

10. The chain guide of claim 6 wherein the chain guide is fabricated from plastic or composites.

11. The chain guide of claim 6 wherein the frame attachment section is permanently attached to a bicycle frame by means of weld, adhesive or composite material.

\* \* \* \* \*